(12) United States Patent
Strozyk et al.

(10) Patent No.: US 10,427,334 B1
(45) Date of Patent: Oct. 1, 2019

(54) GOLF BALL INCORPORATING COMPRESSION MOLDED LAYER AND METHODS AND TOOLING FOR MAKING

(71) Applicant: Acushnet Company, Fairhaven, MA (US)

(72) Inventors: Richard Strozyk, Berkley, MA (US); Felix Egbe, New Bedford, MA (US); Stephen K. Scolamiero, Bristol, RI (US); Bradford Hughes Hartwell, East Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/913,973

(22) Filed: Mar. 7, 2018

(51) Int. Cl.
| | |
|---|---|
| A63B 37/06 | (2006.01) |
| B29C 43/14 | (2006.01) |
| A63B 37/00 | (2006.01) |
| B29C 43/18 | (2006.01) |
| B29C 65/70 | (2006.01) |
| A63B 45/00 | (2006.01) |
| B29L 31/54 | (2006.01) |

(52) U.S. Cl.
CPC ........ B29C 43/146 (2013.01); A63B 37/0039 (2013.01); A63B 37/0078 (2013.01); A63B 37/06 (2013.01); A63B 45/00 (2013.01); B29C 43/18 (2013.01); B29C 65/70 (2013.01); A63B 2037/0079 (2013.01); B29L 2031/546 (2013.01)

(58) Field of Classification Search
CPC .................................................... A63B 45/00

USPC ........................................................ 473/409
See application file for complete search history.

(56) References Cited

U.S. PATENT DOCUMENTS

| | | | |
|---|---|---|---|
| 3,558,406 A | * | 1/1971 | Kugler .................. B31B 70/00 156/251 |
| 5,484,870 A | | 1/1996 | Wu |
| 5,596,251 A | | 1/1997 | Miller |
| 5,798,071 A | | 8/1998 | Boehm |
| 5,935,500 A | | 8/1999 | Stanton et al. |
| 6,129,881 A | | 10/2000 | Puniello |
| 6,207,784 B1 | | 3/2001 | Rajagopalan |
| 6,235,230 B1 | | 5/2001 | Puniello |
| 6,379,138 B1 | | 4/2002 | Puniello et al. |
| 6,436,327 B1 | | 8/2002 | Cloutier et al. |
| 6,562,912 B1 | | 5/2003 | Sullivan et al. |
| 6,787,091 B2 | | 9/2004 | Dalton et al. |
| 6,877,974 B2 | | 4/2005 | Puniello et al. |
| 6,913,726 B2 | | 7/2005 | Brum |
| 6,936,205 B2 | | 8/2005 | Cavallaro et al. |
| 7,204,946 B2 | | 4/2007 | Moore |
| 7,648,667 B2 | | 1/2010 | Brum |

(Continued)

*Primary Examiner* — Raeann Gorden
(74) *Attorney, Agent, or Firm* — Margaret C. Barker

(57) ABSTRACT

Method of making an inventive golf ball incorporating a novel compression molded outer layer comprised of inventive first and second half-shells that are molded from preforms of extrudate, each preform created using a novel flying knife such that a cross-sectioned face of the preform has a curved depth which may be up to 20% greater than the depth of a preform created using a conventional straight edge and/or straight-faced flying knife. In one embodiment, the subassembly of the golf ball is a rubber spherical inner core, and the inventive compression molded outer layer is a rubber outer core layer. In a specific such embodiment, the rubber of the inner core and the rubber of the outer core layer differ.

7 Claims, 6 Drawing Sheets

(56) References Cited

U.S. PATENT DOCUMENTS

| | | |
|---|---|---|
| 8,980,151 B2 | 3/2015 | Chou et al. |
| 9,211,662 B2 | 12/2015 | Kennedy, III et al. |
| 2003/0067088 A1 | 4/2003 | Scolamiero et al. |
| 2013/0072323 A1 | 3/2013 | Lin |
| 2017/0320152 A1 | 11/2017 | Hampton et al. |

* cited by examiner

GOLF BALL INCORPORATING COMPRESSION MOLDED LAYER AND METHODS AND TOOLING FOR MAKING

FIELD OF THE INVENTION

Golf balls having and displaying excellent concentricity between a subassembly and outer layer compression molded thereabout.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids, and blends thereof. Typically, outer layers are formed about the spherical outer surface of an innermost golf ball layer via compression molding, casting, or injection molding.

From the perspective of a golf ball manufacturer, it is desirable to have materials exhibiting a wide range of properties, such as resilience, durability, spin, and "feel," because this enables the manufacturer to make and sell golf balls suited to differing levels of ability and/or preferences. In this regard, playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

Golf balls are generally made by forming outer layers about an interior layer via one or more of injection molding, casting and compression molding. Compression molding typically involves cross-sectioning a length of extrudate into a plurality of preforms/slugs, molding the preforms/slugs into half-shells, and then mating a pair of half-shells about each preform/slug under sufficient heat and pressure.

Heretofore, lengths of extrudate have been cross-sectioned at predetermined intervals by a rotating straight-edge flying knife-type blade while the extrudate progresses on an assembly line in a direction that is perpendicular to the direction that the straight-edge flying knife-type blade is rotating. Examples of such a conventional straight-edged flying knife-type blade include blade 3 of FIG. 1B, discussed herein below, and/or blade 22 of U.S. Pat. No. 5,596,251 of Miller ("'251 patent")(for cutting molten plastic material), hereby incorporated herein in its entirety.

The resulting conventional preforms have cross-sectioned faces that are flat/level to very slightly curved due to forces which act on the extrudate as it progresses along the assembly during cross-sectioning. This flat/level to very slightly curved surface contour changes substantially while being molded into a cup-shaped half-shell.

Unfortunately, such preforms can fill out in the mold unsatisfactorily while making this big shape adjustment and produce a half-shells having irregularities such as a non-uniform thickness. And when those half-shells are then compression molded about a subassembly, the subassembly can be off-center, which negatively impacts golf ball flight and putting characteristics as well as creates golf ball durability problems.

Accordingly, there is a need for improved preform face shapes that more closely match, follow or resemble the ultimate cup-shaped contour of a half-shell which would reduce the amount of change a preform has to undergo while being molded into a half-shell. Such preforms, and methods of making, if meanwhile producible and implementable within existing compression molding and golf ball manufacturing processes, would be particularly desirable and useful. The accompanying inventive golf balls, preforms, half-shells, tooling and methods of making same address and solve this need.

SUMMARY OF THE INVENTION

The invention therefore relates to a method of making a golf ball incorporating inventive half-shells that are comprised of inventively shaped preforms which are created using improved tooling—all desirably implementable within existing compression molding and golf ball manufacturing processes. The method of making the inventive golf ball comprises the steps of: (i) providing a length of extrudate having a width sufficient to be received within first and second half-shell molding cups; (ii) cross-sectioning the extrudate at predetermined intervals along the length while progressing the extrudate along a plane that is perpendicular to a plane of rotation of a curved flying knife and forming a plurality of preforms, each having a cross-sectioned surface that is concave and curves inward toward a posterior end of the preform a curved depth that is greater than a depth created by a straight edge flying knife; (iii) depositing first and second preforms into a golf ball component mold, loading the mold into a mold press, closing the mold press and forming first and second half-shell molding cups under sufficient heat and pressure; wherein the cross-sectioned surfaces of the first and second preforms are face up in the golf ball component mold and form an inner surface of each half shell molding cup; and (iv) mating first and second half-shell molding cups about a subassembly under sufficient heat and pressure.

In this regard, the curved flying knife may comprise (a) an elongated body defining an inner end and a distal end; the inner end being rotatably connectable to a device for cross-sectioning a length of extrudate into a plurality of preforms; and (b) a curved edge located on a first side of the elongated body and an opposing edge located on the opposite side of the elongated body; wherein each of the curved edge and the opposing edge extend between the inner end and distal end; and wherein the curved edge curves away from the opposing edge at least at a location on the first side that contacts the extrudate and cross-sections it.

In another embodiment, the curved flying knife may comprise: (a) an elongated body defining an inner end and a distal end; the inner end being rotatably connectable to a device for cross-sectioning a length of extrudate into a plurality of preforms; and (b) a curved face located on the elongated body between a bladed edge and an opposing edge; wherein each of the bladed edge and the opposing edge co-extend from the distal end toward the inner end a predetermined length and follow the contour of the curved face; and wherein the curved face curves toward the extrudate while the bladed edge cross-sections the extrudate.

In this embodiment, the bladed edge may be straight edged, or alternatively, have a curved edge that curves away from the opposing edge and contacts the extrudate and cross-sections it.

The curved depth may be greater than the depth by up to 20%.

In one embodiment, the subassembly is a rubber inner core and the outer layer is a rubber outer core layer. In one such embodiment, the rubber of the inner core and the rubber of the outer core layer differ.

The invention also relates to a golf ball comprising a spherical subassembly surrounded by an outer layer comprised of first and second compression molded half-shell molding cups comprised of preforms of rubber extrudate that are formed using a curved edge flying knife and have first and second cross-sectioned surfaces each which curve inward toward a posterior end of the preform and have a curved depth that is greater than a depth created by a straight edge flying knife.

The curved depth may be greater than the depth by up to 20%. In one embodiment, the subassembly is a rubber inner core and the outer layer is a rubber outer core layer. In a specific such embodiment, the rubber of the inner core and the rubber of the outer core layer differ.

The invention further relates to a curved flying knife having: (a) an elongated body defining an inner end and a distal end; wherein the inner end is rotatably connectable to a device for creating a plurality of preforms from at least one length of extrudate; (b) a curved edge located on a first side of the elongated body and an opposing edge located on the opposite side of the elongated body; wherein each of the curved edge and the opposing edge extend between the inner end and distal end; and wherein the curved edge curves away from the opposing edge at least at a at a location on the first side that contacts the extrudate and cross-sections it and to a degree sufficient to create a cross-sectioned surface in each preform of extrudate that curves inward toward a posterior end of the preform and has a curved depth that is greater than a depth created by a straight edge flying knife.

In a particular embodiment, the curved depth is greater than the depth by up to 20%.

BRIEF DESCRIPTION OF THE DRAWINGS

These and other aspects of the present invention may be more fully understood with reference to, but not limited by, the following drawings.

DETAILED DESCRIPTION

Figure 1A:
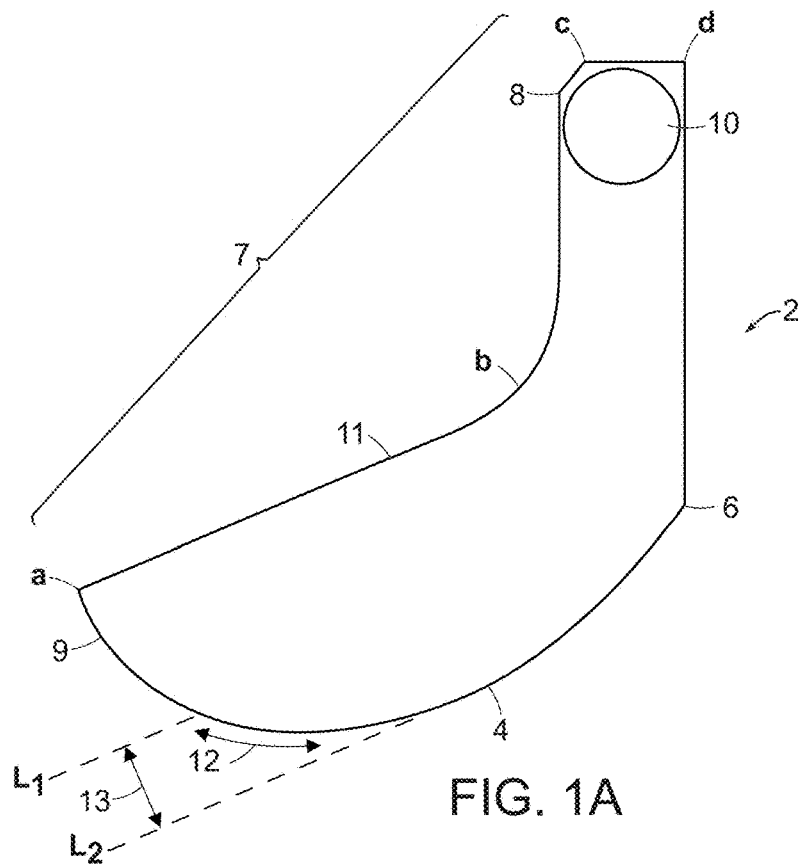
FIG. 1A is a representative side view of a curved flying knife of the invention according to one embodiment.

Advantageously, golf balls, preforms, half-shells, tooling and methods of the invention significantly reduce the amount by which preform shape must change while being molded into a half-shell and therefor also reduces the risk of poor concentricity occurring when a pair of half-shells are compression molded about a subassembly. Preforms of the invention have an improved surface contour constituting a bowl-shaped recess which more closely resembles the ultimate cup-shaped contour of a molded half-shell. This preform construction improves the ability of a preform to fill out in the mold sufficient to create a half-shell having reliably uniform thickness and better matability with an outer surface of the spherical subassembly about which a pair of half shells is compression molded.

In this regard, the invention relates to a method of making the golf ball comprising the steps of: (i) providing a length of extrudate having a width sufficient to be received within first and second half-shell molding cups; (ii) cross-sectioning the extrudate at predetermined intervals along the length while progressing the extrudate along a plane that is perpendicular to a plane of rotation of a curved flying knife and forming a plurality of preforms, each having a cross-sectioned surface that is concave and curves inward toward a posterior end of the preform a curved depth that is greater than a depth created by a straight edge flying knife; (iii) depositing first and second preforms into a golf ball component mold and loading the mold into a mold press, closing the mold press and forming first and second half-shell molding cups under sufficient heat and pressure, wherein the cross-sectioned surfaces of the first and second preforms are face up in the mold and form an inner surface of each half shell molding cup; and (iv) mating first and second half-shell molding cups about a subassembly under sufficient heat and pressure.

As used herein, the terms cross-sectioning or cross-sectioned refer to cutting up a length of extrudate at predetermined intervals using a flying knife while the extrudate progresses along a plane that is perpendicular to a plane of rotation of the flying knife.

Moreover, the term "cross-sectioned surface", as used herein, refers to the contour created in the face of a preform using a flying knife as described herein.

An inventive curved flying knife comprises (a) an elongated body defining an inner end and a distal end; the inner end being rotatably connectable to a device for cross-sectioning a length of extrudate into a plurality of preforms; (b) a curved edge located on a first side of the elongated body and an opposing edge located on the opposite side of the elongated body; wherein each of the curved edge and the opposing edge extend between the inner end and distal end; and wherein the curved edge curves away from the opposing edge at least at a location on the first side that contacts the extrudate and cross-sections it.

The cross-sectioned surface curves inward toward a posterior end of the preform a curved depth that is greater than a depth created by a straight edge flying knife and advantageously is produced by the curved contour of the curved edge flying knife. The curved blade creates a preform having better cut quality due to excellent engagement between curved edge flying knife and extrudate and better matability with the outer surface of a spherical inner core during compression molding than prior preforms due at least in part to a cross-sectioned face which more closely follows or matches the contour of a resulting half shell inner surface.

In this regard, the curved edge of the curved edge flying knife has an arch that extends past the straight edge of the straight edge flying knife a rise sufficient to produce up to 20% greater concavity and bowl-shaped recess in the resulting preform face than produced by the straight edge of the straight edge flying knife having an otherwise identical design. That is, the curved depth created in an inventive preform may be greater than the depth created by the straight edge flying knife by up to 20% without extending engagement time unnecessarily or interfering with engagement quality.

A straight edge blade can produce a preform having two ends with substantially level to slightly curved surfaces due to the forces acting on the extrudate as it progresses along the plane perpendicular to the rotating direction of the straight edge blade. In contrast, the curved depth of a preform of the invention will be up to 20% greater than that created by an otherwise identical straight edge flying knife.

The extrudate may have any known length, but should have a width that is sized to be received within the selected first and second half-shell molding cups after the extrudate is cross-sectioned into preforms since the width or thickness of the extrudate is not modified by cross-sectioning.

Meanwhile, a curved flying knife of the invention has a larger blade volume contacting the extrudate than would an otherwise identical prior straight edge rotating flying knife due to the rise of the curved edge flying knife (such as rise 12 of curved flying knife 2 depicted in FIG. 1A—detailed below). Trying a curved edge flying knife is counterintuitive because increasing blade volume increases engagement time which has known to negatively impact cut quality and therefore manufacturing time and cost.

Figure 1B:
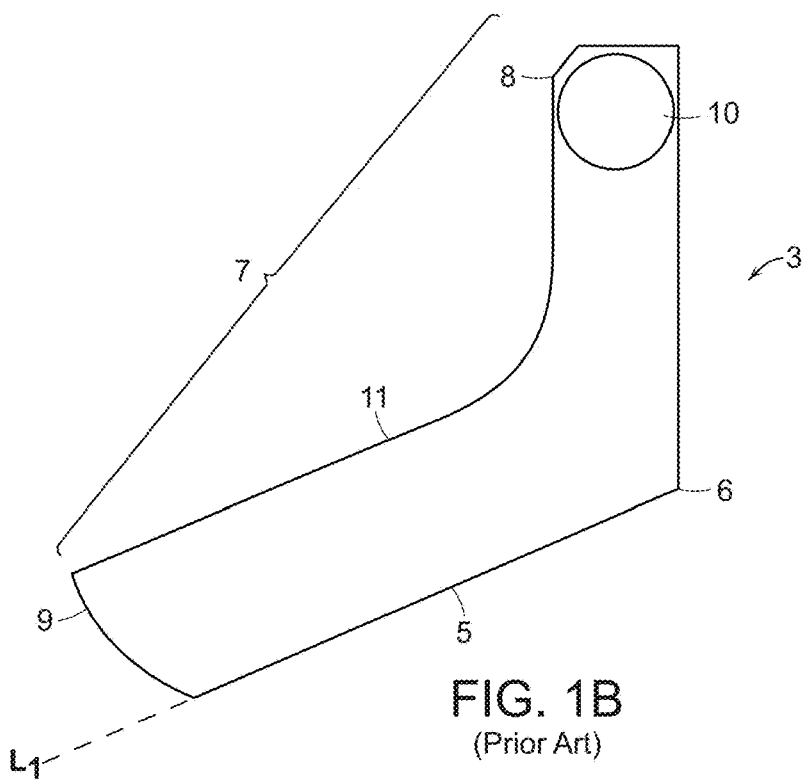
FIG. 1B is a representative side view of a conventional straight edge flying knife.

One such inventive flying knife 2 is depicted in FIG. 1A and compared with conventional flying knife 3 of FIG. 1B. Inventive flying knife 2 of FIG. 1A has a curved edge 4. In contrast, conventional flying knife 3 of FIG. 1B has a straight edge 5. Each of curved edge 4 and straight edge 5 are located on a first side 6 of an elongated body 7, which defines an inner end 8 and a distal end 9. Inner end 8 is rotatably connectable at location 10 to a device (not shown) for controlling and monitoring cross-sectioning of a length of extrudate into a plurality of preforms. An opposing edge 11 is located opposite first side 6 on elongated body 7 and also between inner end 8 and distal end 9. In FIG. 1A, curved edge 4 curves away from opposing edge 11 and has an arch 12 that creates rise 13 extending from $L_1$ to $L_2$. $L_1$ illustrates where straight edge 5 is in otherwise identical straight edge flying knife 3 (see straight edge 5 in FIG. 1B).

Figure 2A:
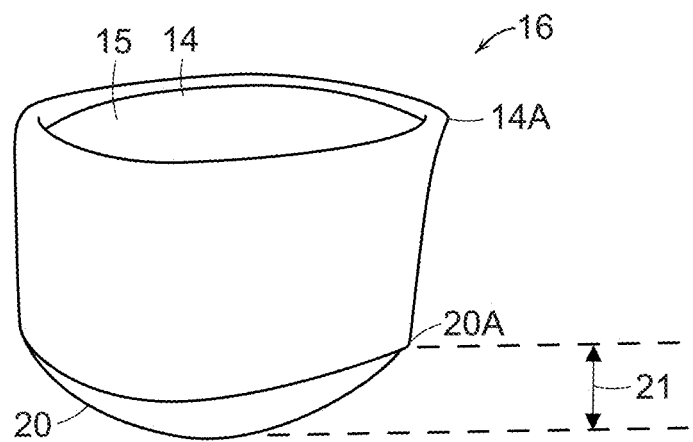
FIG. 2A is a representative side view of a preform of the invention.
Figure 2B:
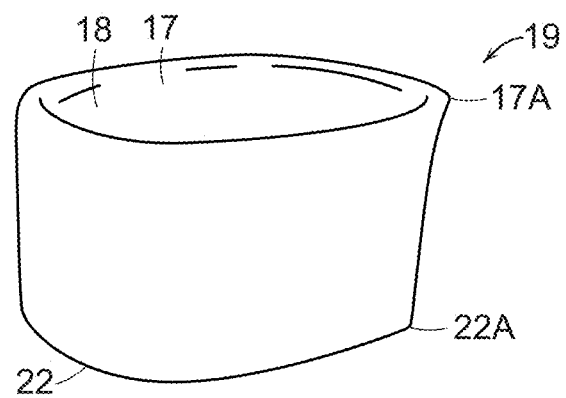
FIG. 2B is a representative side view of a conventional preform produced using a conventional straight edge flying knife.

Rise 13 of curved flying knife 1A is sufficient to create an inwardly curved depth 14 in face 15 of inventive preform 16 of FIG. 2A during cross-sectioning that is up to 20% greater than any depth 18 created in face 17 of conventional preform 19 of FIG. 2B (created by conventional straight edge flying knife 3 of FIG. 1B). Curved depth 14 in face 15 of inventive preform 16 of FIG. 2A is a bowl-shaped recess which extends symmetrically circumferentially about and within face 15 a curved depth 14 created by curved edge 4 as flying knife 2 rotates perpendicularly with respect to the direction along which a length of extrudate to be cross-sectioned into inventive preform 16 progresses.

In contrast, preform 19 has an almost level face 17. In this regard, conventional flying knife 3 can produce a face 17 that is substantially level but may not be completely level even though flying knife 3 has a straight edge due to forces acting on the extrudate as the extrudate progresses along a plane that is perpendicular to rotatably striking straight edge flying knife 3.

Inventive preform 16 of FIG. 2A has a posterior end 20 that opposes inward curved depth 14 and thereby extends outwardly from preform 16 an outward depth 21. In contrast, conventional preform 19 of FIG. 2B has a posterior end 22 that opposes face 17 and is substantially level but may not be completely level and may extend slightly outward from preform 19.

Preforms 16 may each then be deposited/placed in golf ball component molds (not shown) such that curved faces 15 are positioned face up in each golf ball component mold, whereas posterior ends 20 are adjacent to and do contact and are adjacent the golf ball component mold. Once the golf ball component mold containing a preform is loaded into a mold press, the press is closed, and sufficient heat and pressure is applied, each preform face 15 is converted into a half shell having a uniformly distributed thickness about the half-shell and an inner surface contour which uniquely and suitably conforms with the contour of an outer surface of a spherically shaped subassembly—thereby producing better concentricity between the subassembly and outer layers once a pair of half-shells are compression molded about the subassembly.

Figure 1C:
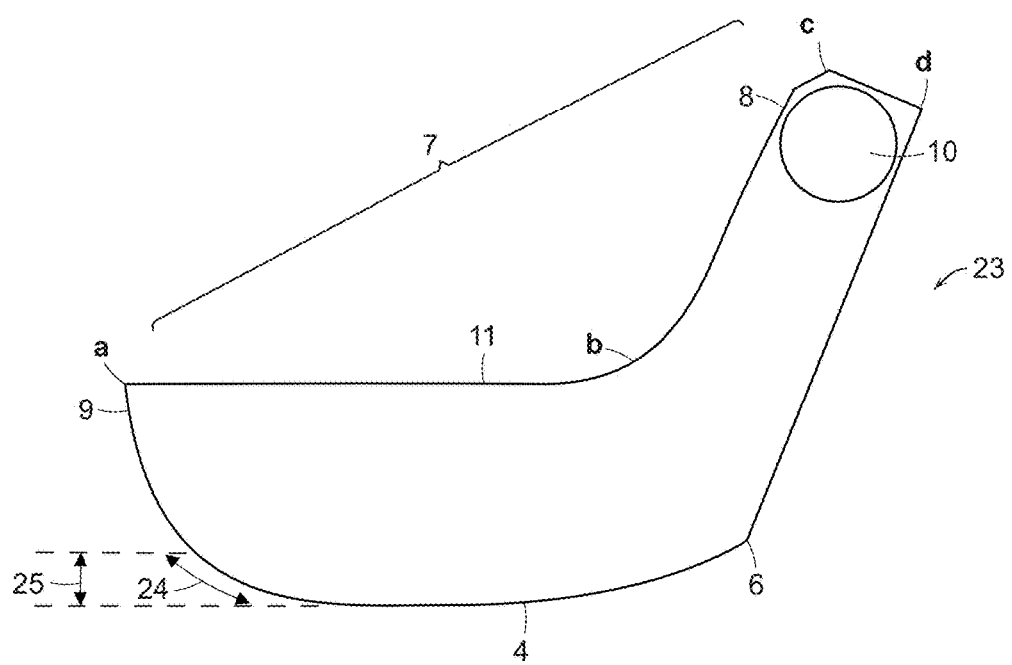
FIG. 1C is a representative side view of a curved flying knife of the invention according to another embodiment.

FIG. 1C is yet another example of an inventive curved flying knife of the invention. Curved flying knife 23 includes, among other common elements introduced with respect to the curved flying knife of FIG. 1A, a curved edge 4 which curves away from opposing edge 11 and has an arch 24 and rise 25 which are less than arch 12 and rise 13 the curved flying knife of FIG. 1A. but nonetheless suitable for creating an inwardly curved depth/bowl-shaped recess in a preform face and therefore a half-shell having a uniformly distributed thickness about the half-shell and an inner surface contour producing excellent concentricity between a subassembly and a pair of half-shells molded about the subassembly.

Figure 3:
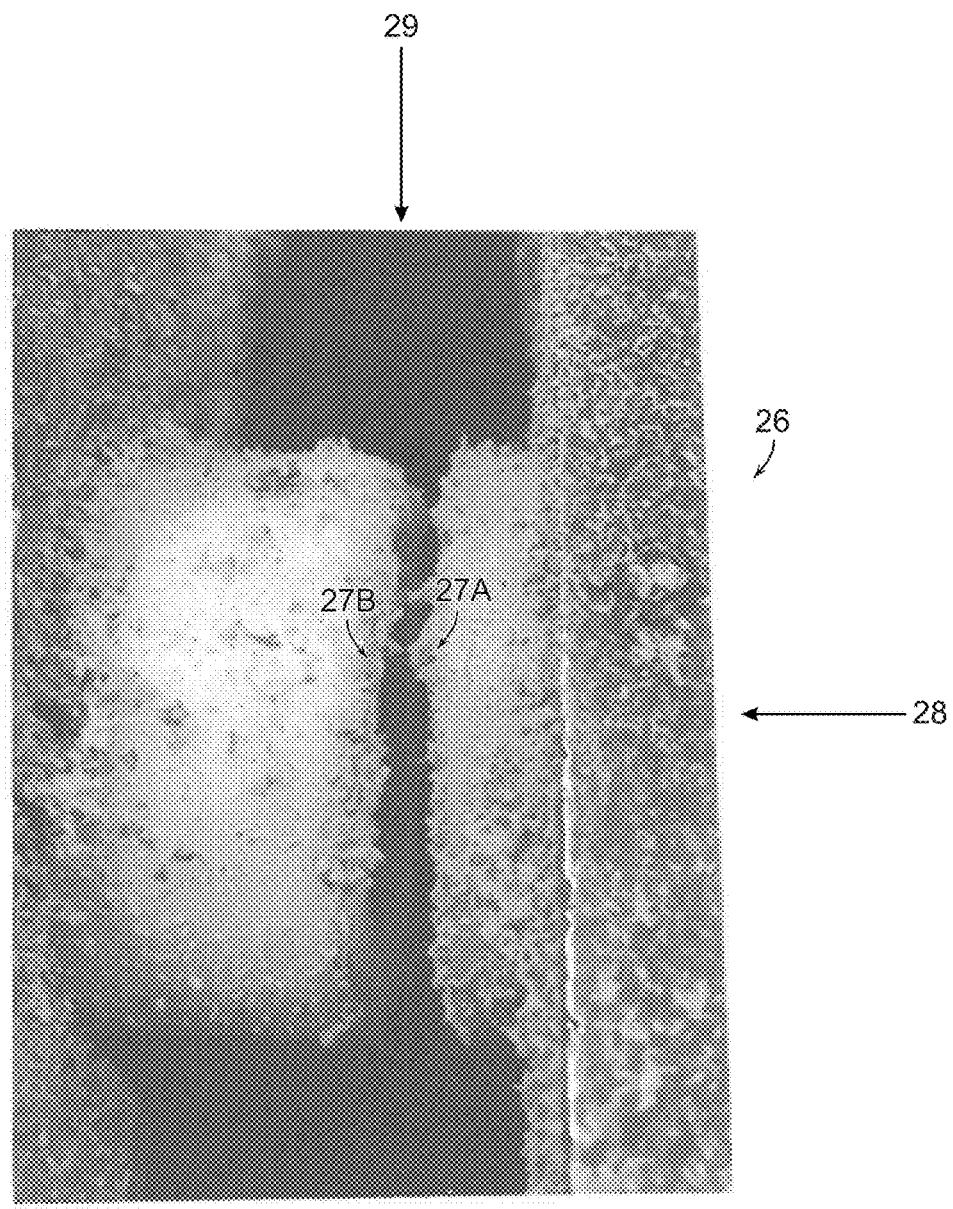
FIG. 3 is a representative side view of a pathway through which a curved flying knife of the invention cross-sections a length of extrudate at predetermined intervals as the extrudate progresses in a plane that is perpendicular to the plane of rotation of the curved flying knife.

FIG. 3 depicts a suitable cutting location 26 in the process for creating a plurality of preforms, wherein a length of extrudate proceeds in direction 28 for cross-sectioning while a curved flying knife such as those of FIGS. 1A and/or 1C rotates in direction 29 between tubes 27A and 27B, and perpendicularly with respect to direction 28 to cross-section the extrudate at predetermined intervals.

In alternative embodiments, the curved depth may be greater than the depth by from about 5% to 20%, or from 5% to 20%, or from about 10% to 20%, or from 10% to 20%, or from about 15% to 20%, or from 15% to 20%, or from about 5% to about 15%, or from 5% to 15%, or from about 5% to about 10%, or from 5% to 10%, or from about 10% to about 15%, or from 10% to 15%, or greater than 5%, or 10% or greater, or at least 15%, or about 20%.

In particular embodiments, the rise of an inventive curved flying knife such as rise 13 or rise 24 can be as high as 1.0 inch (2.54 cm). In other embodiments, the rise can be up to 0.75 inches (1.90 cm), or up to 0.50 inches (1.27 cm). In some embodiments, the rise can be between 0.25 inches (0.63 cm) and 1.0 inches, or from 0.25 inches to about 1.0 inches, or from about 0.50 inches to about 1.0 inches, or from about 0.50 inches to 0.75 inches, or from 0.50 inches to about 0.75 inches. It is envisioned that the rise can be greater than 1.0 inches so long as resulting curved depth 14 in a preform of the invention displays and produces improved half-shells of the invention having the improvements and characteristics described herein.

In one non-limiting example, resulting preform 2 has a predetermined interval from outer edge 14*a* of face 14 to outer edge 20*a* of posterior end 20 of about 2 cm. Curved depth 14 is about 4 mm inward from outer edge 14*a*. In turn, outward depth 21 is about 4 mm outward from outer edge 20*a*. In this embodiment, a preform 19, cross-sectioned with a straight-edge flying knife 3, has a face 17 with a depth 18 that is 20% less than curved depth 14. Depth 18 is measured from inward from or across outer edge 17*a*. In turn, any depth 21 is measured outward from or across from edge 22*a*.

Embodiments are indeed envisioned wherein curved flying knives 2 and/or 23 are constructed so as to create a curved depth 14 of up to 50% of the distance between outer edge 14*a* and outer edge 20*a* of preform 2 of FIG. 2A. Rise 13 of curved flying knife 2 provides a unique and bowl-shaped recess and contour in curved depth 14 of preform face 15 which more closely follows the ultimate contour of a molded half-shell and therefor improves moldability of the half-shell without creating imperfections of deficiencies that would produce a non-centered subassembly when a pair of half-shells are compression molded about the subassembly. This therefore contributes to a more uniform thickness distribution within and about resulting half-shells which in turn have better comformity with the subassembly about which a pair of half-shells are compression molded.

Figure 4A:
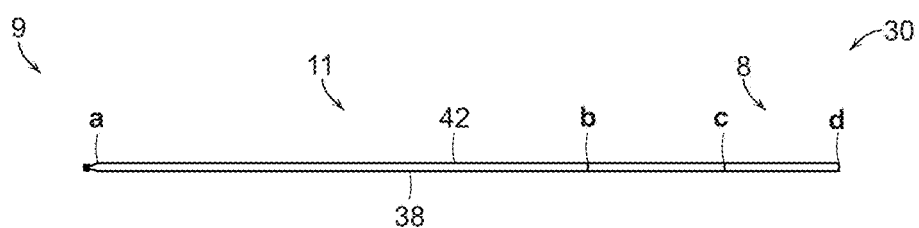
FIG. 4A is a top view of a curved flying knife of the invention according to one embodiment.

Flying knives 2 and 23 can have a top view 30 of FIG. 4A which extends from inner end 8 to distal end 9 of elongated body 11 and appears straight, with locations a, b, c and d of FIG. 4A corresponding to locations a, b, c and d of each of FIGS. 1A and 1C.

Figure 4B:
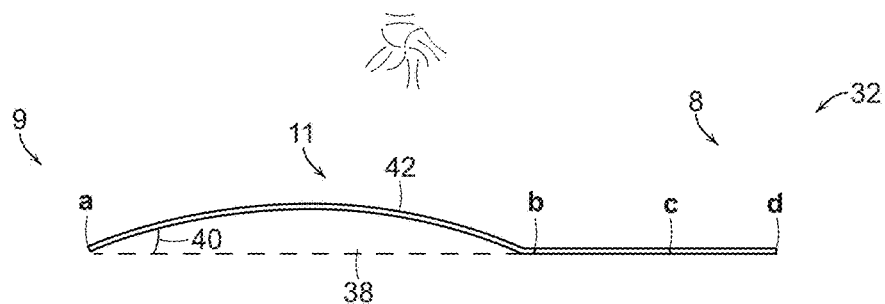
FIG. 4B is a top view of a curved flying knife of the invention according to another embodiment.
Figure 5A:
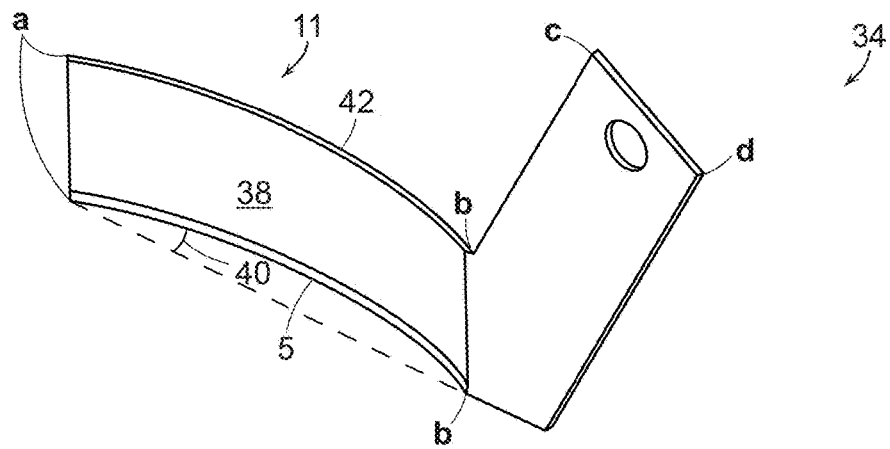
FIG. 5A is a representative side view of a curved flying knife of the invention according to yet another embodiment.
Figure 5B:
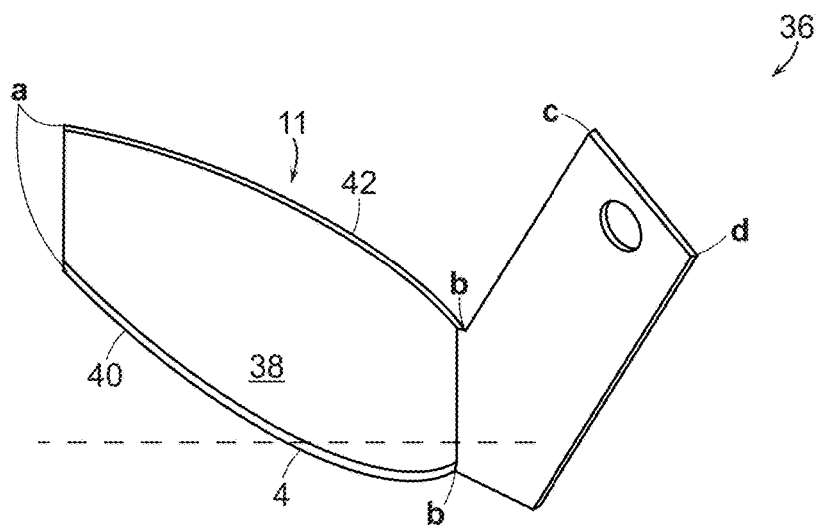
FIG. 5B a representative side view of a curved flying knife of the invention according to still another embodiment.

Further, FIG. 4B depicts a top view 32 of two additional embodiments of a flying knife of the invention, namely example flying knife 34 of FIG. 5A and example flying knife 36 of FIG. 5B. In these embodiments, the curved flying knife may comprise: (a) an elongated body defining an inner end and a distal end; the inner end being rotatably connectable to a device for cross-sectioning a length of extrudate into a plurality of preforms; and (b) a curved face located on the elongated body between a bladed edge and an opposing edge; wherein each of the bladed edge and the opposing edge co-extend from the distal end toward the inner end a predetermined length and follow the contour of the curved face; and wherein the curved face curves toward the extrudate while the bladed edge cross-sections the extrudate. In this embodiment, the bladed edge may be straight edged, or alternatively, have a curved edge that curves away from the opposing edge and contacts the extrudate and cross-sections it (such as curved edges 4 of inventive flying knives 2 and 23).

Top view 32 of FIG. 4B extends from inner end 8 to distal end 9 of elongated body 11, with locations a, b, c and d of FIG. 4A corresponding to locations a, b, c and d of each of FIGS. 5A and 5B. In each of flying knife 34 and flying knife 36, elongated body 11 has a curved face 38 between locations a and b rather than the straight face of inventive flying knives 2 and 23 between locations a and b. And curved face 38 has a curvature angle 40 of up to 20° with respect to a line between locations a and b. Meanwhile, an opposing side 42 of curved face 38 is exposed to a length of extrudate during cross-sectioning.

Inventive flying knife 36 of FIG. 5B differs from inventive flying knife 34 of FIG. 5A in that inventive flying knife 36 has a curved edge 4, whereas flying knife 34 has a straight edge 5, each therefore creating quite different and unique curved depths 14 in an inventive preform 16 even though both flying knife 34 and flying knife 36 have a curved face 38 and opposing side 42.

The invention also relates to a golf ball comprising a spherical subassembly surrounded by an outer layer comprised of first and second compression molded half-shells comprised of preforms created by cross-sectioning a length of rubber extrudate at predetermined intervals using a curved edge flying knife and have first and second cross-sectioned surfaces each which curve inward toward a posterior end of the preform and have a curved depth that is greater than a depth created by a straight edge flying knife.

In one embodiment, the subassembly is a rubber inner core and the outer layer is a rubber outer core layer. In one such embodiment, the rubber of the inner core and the rubber of the outer core layer differ.

Typically, a Banbury-type mixer or the like is used to mix the polybutadiene rubber composition. The rubber composition is extruded as an extrudate and cut to a predetermined shape, such as a cylinder, typically called a "preform". The preform comprising the uncured polybutadiene composition The invention further relates to a curved flying knife having: (a) an elongated body defining an inner end and a distal end; wherein the inner end is rotatably connectable to a device for creating a plurality of preforms from at least one length of extrudate; (b) a curved edge located on a first side of the elongated body and an opposing edge located on the opposite side of the elongated body; wherein each of the curved edge and the opposing edge extend between the inner end and distal end; and wherein the curved edge curves away from the opposing edge at least at a at a location on the first side that contacts the extrudate and cross-sections it and to a degree sufficient to create a cross-sectioned surface in each preform of extrudate that curves inward toward a posterior end of the preform and has a curved depth that is greater than a depth created by a straight edge flying knife. In a particular embodiment, the curved depth is greater than the depth by up to 20%.

Embodiments are also envisioned wherein first and second inventive preforms are created as describe above but are molded directly about a subassembly using molding processes known in the art rather than being pre-molded into half shells.

It was counterintuitive to try the inventive curved-blade flying knife when cross-sectioning extrudate into preforms because increasing the volume of the blade contacting the extrudate also increases engagement time between blade and extrudate which has been known to negatively impact cur quality and increase overall manufacture time and thereby costs. Unexpectedly, increasing the engagement time using a curved flying knife blade improves the quality and shape of the preform used to form a half-shell which in turn improves concentricity between subassembly and resulting pair of compression molded half-shells.

Golf balls having various constructions may be made in accordance with this invention, as long as at least one improved outer layer is compression molded about at least one inner layer and formed from an improved half-shell that is comprised of a preform of the invention and formed using the methods and curved flying knife as described herein. Thus, golf balls of the invention may have at least two layers (two piece), and may alternatively be three piece, four-piece, and five-piece, etc. constructions with single or multi-layered cores, intermediate layers, and/or covers.

As used herein the term, "layer" means generally any spherical portion of the golf ball. More particularly, in one version, a two-piece golf ball containing a core surrounded by a compression molded cover is made. Three-piece golf balls may be made containing a dual-layered core and single-layered cover, wherein at least one of an outer core layer and the cover are compression molded according to the golf ball components and methods of the invention. In another version, a four-piece golf ball containing a dual-core and dual-cover (inner cover and outer cover layers) is made, wherein any one or more of the outer layers is compression molded according to the invention.

As used herein, the term, "intermediate layer" refers to any layer of the ball disposed between the innermost spherical core and the outermost cover layer and may include outer core layers, casing/mantle layers and inner cover layers. The diameter and thickness of the different layers along with properties such as hardness and compression may vary depending upon the construction and desired playing performance properties of the golf ball as discussed further below. And a compression molded layer of a golf ball of the invention may have any known compression moldable thickness.

In a particular embodiment, an outer core layer of compression molded inventive half-shells comprised of inventive preform comprises a rubber composition (polybutadiene rubber material) and is compression molded about an inner core that comprises a different rubber material.

It is envisioned that a compression molded layer of the invention may include any compression moldable composition or material.

In an embodiment wherein the inner core and outer core layer comprise a different rubber materials, such may be selected, for example, from polybutadiene, ethylene-propylene rubber, ethylene-propylene-diene rubber, polyisoprene, styrene-butadiene rubber, polyalkenamers, butyl rubber, halobutyl rubber, or polystyrene elastomers.

In general, polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

Golf ball layers can be formed from any materials known in the art, including thermoplastic and thermosetting materials. For example, suitable materials include ionomer compositions comprising an ethylene acid copolymer containing acid groups that are at least partially neutralized. Suitable ethylene acid copolymers that may be used to form the intermediate layers are generally referred to as copolymers of ethylene; $C_3$ to $C_8$ α, β-ethylenically unsaturated mono- or dicarboxylic acid; and optional softening monomer. These ethylene acid copolymer ionomers also can be used to form the inner core and outer core layers as described above.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form golf ball layers include, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly (propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d)

fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the core and intermediate layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Modifications in thermoplastic polymeric structure can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic layers may be irradiated at dosages greater than 0.05 Mrd, or ranging from 1 Mrd to 20 Mrd, or ranging from 2 Mrd to 15 Mrd, or ranging from 4 Mrd to 10 Mrd. In one embodiment, the layer may be irradiated at a dosage from 5 Mrd to 8 Mrd and in another embodiment, the layer may be irradiated with a dosage from 0.05 Mrd to 3 Mrd, or from 0.05 Mrd to 1.5 Mrd.

It is meanwhile envisioned that in some embodiments/golf ball constructions, it may be beneficial to also include at least one layer formed from or blended with a conventional isocyante-based material. The following conventional compositions as known in the art may be incorporated to achieve particular desired golf ball characteristics:

(1) Polyurethanes, such as those prepared from polyols and diisocyanates or polyisocyanates and/or their prepolymers, and those disclosed in U.S. Pat. Nos. 5,334,673 and 6,506,851;

(2) Polyureas, such as those disclosed in U.S. Pat. Nos. 5,484,870 and 6,835,794; and (3) Polyurethane/urea hybrids, blends or copolymers comprising urethane and urea segments such as those disclosed in U.S. Pat. No. 8,506,424.

Suitable polyurethane compositions comprise a reaction product of at least one polyisocyanate and at least one curing agent. The curing agent can include, for example, one or more polyols. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated herein in its entirety by reference.

In general, polyurea compositions contain urea linkages formed by reacting an isocyanate group (—N═C═O) with an amine group (NH or NH$_2$). The chain length of the polyurea prepolymer is extended by reacting the prepolymer with an amine curing agent. The resulting polyurea has elastomeric properties, because of its "hard" and "soft" segments, which are covalently bonded together. The soft, amorphous, low-melting point segments, which are formed from the polyamines, are relatively flexible and mobile, while the hard, high-melting point segments, which are formed from the isocyanate and chain extenders, are relatively stiff and immobile. The phase separation of the hard and soft segments provides the polyurea with its elastomeric resiliency. The polyurea composition contains urea linkages having the following general structure:

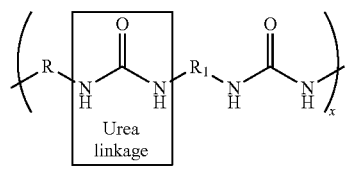
Urea linkage where x is the chain length, i.e., about 1 or greater, and R and R$_1$ are straight chain or branched hydrocarbon chains having about 1 to about 20 carbon atoms.

A polyurea/polyurethane hybrid composition is produced when the polyurea prepolymer (as described above) is chain-extended using a hydroxyl-terminated curing agent. Any excess isocyanate groups in the prepolymer will react with the hydroxyl groups in the curing agent and create urethane linkages. That is, a polyurea/polyurethane hybrid composition is produced.

In a preferred embodiment, a pure polyurea composition, as described above, is prepared. That is, the composition contains only urea linkages. An amine-terminated curing agent is used in the reaction to produce the pure polyurea composition. However, it should be understood that a polyurea/polyurethane hybrid composition also may be prepared in accordance with this invention as discussed above. Such a hybrid composition can be formed if the polyurea prepolymer is cured with a hydroxyl-terminated curing agent. Any excess isocyanate in the polyurea prepolymer reacts with the hydroxyl groups in the curing agent and forms urethane linkages. The resulting polyurea/polyurethane hybrid composition contains both urea and urethane linkages. The general structure of a urethane linkage is shown below:

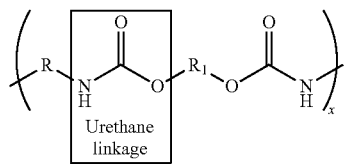

where x is the chain length, i.e., about 1 or greater, and R and $R_1$ are straight chain or branched hydrocarbon chains having about 1 to about 20 carbon atoms.

There are two basic techniques that can be used to make the polyurea and polyurea/urethane compositions of this invention: a) one-shot technique, and b) prepolymer technique. In the one-shot technique, the isocyanate blend, polyamine, and hydroxyl and/or amine-terminated curing agent are reacted in one step. On the other hand, the prepolymer technique involves a first reaction between the isocyanate blend and polyamine to produce a polyurea prepolymer, and a subsequent reaction between the prepolymer and hydroxyl and/or amine-terminated curing agent. As a result of the reaction between the isocyanate and polyamine compounds, there will be some unreacted NCO groups in the polyurea prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurea and polyurea/urethane compositions of the invention; however, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

In the casting process, the polyurea and polyurea/urethane compositions can be formed by chain-extending the polyurea prepolymer with a single curing agent or blend of curing agents as described further below. The compositions of the present invention may be selected from among both castable thermoplastic and thermoset materials. Thermoplastic polyurea compositions are typically formed by reacting the isocyanate blend and polyamines at a 1:1 stoichiometric ratio. Thermoset compositions, on the other hand, are cross-linked polymers and are typically produced from the reaction of the isocyanate blend and polyamines at normally a 1.05:1 stoichiometric ratio. In general, thermoset polyurea compositions are easier to prepare than thermoplastic polyureas.

The polyurea prepolymer can be chain-extended by reacting it with a single curing agent or blend of curing agents (chain-extenders). In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurea prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4, 4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenyl-methane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediyl-bis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5 '-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea/urethane hybrid.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

In an alternative embodiment, the cover layer may comprise a conventional polyurethane or polyurethane/urea hybrid composition. In general, polyurethane compositions contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

Suitable isocyanate compounds that can be used to prepare the polyurethane or polyurethane/urea hybrid material are described above. These isocyanate compounds are able to react with the hydroxyl or amine compounds and form a durable and tough polymer having a high melting point. The resulting polyurethane generally has good mechanical strength and cut/shear-resistance. In addition, the polyurethane composition has good light and thermal-stability.

When forming a polyurethane prepolymer, any suitable polyol may be reacted with the above-described isocyanate blends in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

In a manner similar to making the above-described polyurea compositions, there are two basic techniques that can be used to make the polyurethane compositions of this invention: a) one-shot technique, and b) prepolymer technique. In the one-shot technique, the isocyanate blend, polyol, and hydroxyl-terminated and/or amine-terminated chain-extender (curing agent) are reacted in one step. On the other hand, the prepolymer technique involves a first reaction between the isocyanate blend and polyol compounds to produce a polyurethane prepolymer, and a subsequent reaction between the prepolymer and hydroxyl-terminated and/or amine-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is in the range of about 1.01:1.00 to about 1.10:1.00. Preferably, the molar ratio is greater than or equal to 1.05:1.00. For example, the molar ratio can be in the range of 1.05:1.00 to 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single curing agent (chain-extender) or blend of curing agents (chain-extenders) as described further below. The compositions of the present invention may be selected from among both castable thermoplastic and thermoset polyurethanes. Thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio. In general, thermoset polyurethane compositions are easier to prepare than thermoplastic polyurethanes.

As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyol compounds for producing the polyurethane prepolymer or between the polyurethane prepolymer and chain-extender during the chain-extending step. Preferably, the catalyst is added to the reactants before producing the polyurethane prepolymer. Suitable catalysts include, but are not limited to, the catalysts described above for making the polyurea prepolymer. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

Suitable hydroxyl chain-extending (curing) agents and amine chain-extending (curing) agents include, but are not limited to, the curing agents described above for making the polyurea and polyurea/urethane hybrid compositions. When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

Those layers of golf balls of the invention comprising conventional thermoplastic or thermoset materials may be formed using a variety of conventional application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entireties.

A method of injection molding using a split vent pin can be found in co-pending U.S. Pat. No. 6,877,974, filed Dec. 22, 2000, entitled "Split Vent Pin for Injection Molding." Examples of retractable pin injection molding may be found in U.S. Pat. Nos. 6,129,881; 6,235,230; and 6,379,138. These molding references are incorporated in their entirety by reference herein. In addition, a chilled chamber, i.e., a cooling jacket, such as the one disclosed in U.S. Pat. No. 6,936,205, filed Nov. 22, 2000, entitled "Method of Making Golf Balls" may be used to cool the compositions of the invention when casting, which also allows for a higher loading of catalyst into the system.

Golf balls of the invention include at least one compression molded layer comprising or consisting of any extrudate that can be preformed according to methods of the invention—including, for example, extrudates comprised of rubber-based compositions. Conventionally, compression molding and injection molding are applied to thermoplastic materials, whereas RIM, liquid injection molding, and casting are employed on thermoset materials. These and other manufacture methods are disclosed in U.S. Pat. Nos. 5,484,870; 5,935,500; 6,207,784; 6,436,327; 7,648,667; 6,562,912; 6,913,726; 7,204,946; 8,980,151; 9,211,662; U.S. Publs. Nos. 2003/0067088; and 2013/0072323; the disclosures of each of which are incorporated herein by reference in their entirety.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present invention.

However, golf balls of the invention may be made by any known technique to those skilled in the art.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

The solid cores for the golf balls of this invention may be made using any suitable conventional technique such as, for example, compression or injection-molding, Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art. The cover layers are formed over the core or ball sub-assembly (the core structure and any intermediate layers disposed about the core) using any suitable method as described further below. Prior to forming the cover layers, the ball sub-assembly may be surface-treated to increase the adhesion between its outer surface and the overlying cover material using the above-described techniques.

Conventional compression and injection-molding and other methods can be used to form cover layers over the core or ball sub-assembly. In general, compression molding normally involves first making half (hemispherical) shells by injection-molding the composition in an injection mold or creating preforms from exturdate. This produces semi-cured, semi-rigid half-shells (or cups). Then, the half-shells are positioned in a compression mold around the core or ball sub-assembly. Heat and pressure are applied and the half-shells fuse together to form a cover layer over the core or sub-assembly. Compression molding also can be used to cure the cover composition after injection-molding. For example, a thermally-curable composition can be injection-molded around a core in an unheated mold. After the composition is partially hardened, the ball is removed and placed in a compression mold. Heat and pressure are applied to the ball and this causes thermal-curing of the outer cover layer.

Retractable pin injection-molding (RPIM) methods generally involve using upper and lower mold cavities that are mated together. The upper and lower mold cavities form a spherical interior cavity when they are joined together. The mold cavities used to form the outer cover layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer. Other methods can be used to make the cover including, for example, reaction injection-molding (RIM), liquid injection-molding, casting, spraying, powder-coating, vacuum-forming, flow-coating, dipping, spin-coating, and the like.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

After the golf balls have been removed from the mold, they may be subjected to finishing steps such as flash-trimming, surface-treatment, marking, and one or more coating layer may be applied as desired via methods such as spraying, dipping, brushing, or rolling. Then the golf ball can go through a series of finishing steps.

For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

The golf balls of this invention provide the ball with a variety of advantageous mechanical and playing performance properties as discussed further below. In general, the hardness, diameter, and thickness of the different ball layers may vary depending upon the desired ball construction. Thus, golf balls of the invention may have any known overall diameter and any known number of different layers and layer thicknesses, wherein the inventive compression molded layer is incorporated in one or more outer layers in order to target desired playing characteristics.

For example, the core may have a diameter ranging from about 0.09 inches to about 1.65 inches. In one embodiment, the diameter of the core of the present invention is about 1.2 inches to about 1.630 inches. When part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches.

In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 or 0.750 inches.

An intermediate core layer can have any known overall thickness such as within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches.

The cores and core layers of golf balls of the invention may have varying hardnesses depending on the particular golf ball construction and playing characteristics being targeted. Core center and/or layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

The compression of the core is generally overall in the range of about 40 to about 110, although embodiments are envisioned wherein the compression of the core is as low as 5. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise rubbers and also may be formed of a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing/mantle layer, and/or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters. However, embodiments are envisioned wherein at least one intermediate layer is formed from a different material commonly used in a core and/or cover layer.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater.

For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

If the ball includes an intermediate layer or inner cover layer, the hardness (material) may for example be about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches, but once again, may be changed to target playing characteristics.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

The outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Preferably, the thickness of the outer cover is about 0.020 inches or less. The outer cover preferably has a surface hardness of 75 Shore D or less, 65 Shore D or less, or 55 Shore D or less, or 50 Shore D or less, or 50 Shore D or less, or 45 Shore D or less. Preferably, the outer cover has hardness in the range of about 20 to about 70 Shore D. In one example, the outer cover has hardness in the range of about 25 to about 65 Shore D.

In one embodiment, the cover may be a single layer having a surface hardness for example of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from a composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer and an outer cover layer. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer and an outer cover layer. The inner cover layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may have a material hardness of 65 Shore D or less, or 55 Shore D or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

All this being said, embodiments are also envisioned wherein one or more of the cover layers is formed from a material typically incorporated in a core or intermediate layer.

It is envisioned that golf balls of the invention may also incorporate conventional coating layer(s) for the purposes usually incorporated. For example, one or more coating layer may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

It is envisioned that layers a golf ball of the invention other than the inventive compression molded layer may be incorporated via any of casting, compression molding, injection molding, or thermoforming.

The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (CoR) of at least 0.750 and more preferably at least 0.800 (as measured per the test methods below). The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

The following test methods may be used to obtain certain properties in connection with golf balls of the invention and layers thereof.

Hardness.

The center hardness of a core is obtained according to the following procedure. The core is gently pressed into a hemispherical holder having an internal diameter approximately slightly smaller than the diameter of the core, such that the core is held in place in the hemispherical of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.

Modulus, Tensile Strength and Ultimate Elongation

Modulus, tensile strength and ultimate elongation of golf ball layer materials may be targeted as known in the art. As used herein, "modulus" or "flexural modulus" refers to flexural modulus as measured using a standard flex bar according to ASTM D790-B; tensile strength refers to tensile strength as measured using ASTM D-638; and ultimate elongation refers to ultimate elongation as measured using ASTM D-638.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core×amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("CoR").

The CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($CoR = V_{out}/V_{in} = T_{in}/T_{out}$).

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the golf balls of the invention incorporating inventive half-shells comprised of inventive preforms and methods and tooling for making as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

It is understood that the manufacturing methods, compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

The invention claimed is:

1. A method of making a golf ball comprising the steps of:
providing a length of extrudate having a width sufficient to be received within first and second half-shell molding cups;
cross-sectioning the extrudate at predetermined intervals along the length while progressing the extrudate along a plane that is perpendicular to a plane of rotation of a curved flying knife and forming a plurality of preforms, each having a cross-sectioned surface that is concave and curves inward toward a posterior end of the preform a curved depth that is greater than a depth created by a straight edge flying knife;
wherein the curved flying knife comprises:
an elongated body defining an inner end and a distal end; the inner end being rotatably connectable to a device for cross-sectioning a length of extrudate into a plurality of preforms;
a curved edge located on a first side of the elongated body and an opposing edge located on the opposite side of the elongated body; wherein each of the curved edge and the opposing edge extend between the inner end and distal end; and
wherein the curved edge curves away from the opposing edge at least at a location on the first side that contacts the extrudate and cross-sections it; and
depositing first and second preforms into a golf ball component mold, loading the mold into a mold press, closing the mold press, and forming first and second half-shell molding cups under sufficient heat and pressure;
wherein the cross-sectioned surfaces of the first and second preforms are face up in the golf ball component mold and form an inner surface of each half shell molding cup; and
mating first and second half-shell molding cups about a subassembly under sufficient heat and pressure.

2. The method of making a golf ball of claim 1, wherein the curved depth is greater than the depth by up to 20%.

3. The method of making a golf ball of claim 2, wherein the subassembly is a rubber inner core and the outer layer is a rubber outer core layer.

4. The method of making a golf ball of claim 3, wherein the rubber of the inner core and the rubber of the outer core layer differ.

5. A method of making a golf ball comprising the steps of:
providing a length of extrudate having a width sufficient to be received within first and second half-shell molding cups;
cross-sectioning the extrudate at predetermined intervals along the length while progressing the extrudate along a plane that is perpendicular to a plane of rotation of a curved flying knife and forming a plurality of preforms, each having a cross-sectioned surface that is concave and curves inward toward a posterior end of the preform a curved depth that is greater than a depth created by a straight edge flying knife;
wherein the curved flying knife comprises:
an elongated body defining an inner end and a distal end; the inner end being rotatably connectable to a device for cross-sectioning a length of extrudate into a plurality of preforms;
a curved face located on the elongated body between a bladed edge and an opposing edge;
wherein each of the bladed edge and the opposing edge co-extend from the distal end toward the inner end a predetermined length and follow a contour of the curved face; and
wherein the curved face curves toward the extrudate while the bladed edge cross-sections the extrudate; and
depositing first and second preforms into a golf ball component mold, loading the mold into a mold press, closing the mold press, and forming first and second half-shell molding cups under sufficient heat and pressure;

wherein the cross-sectioned surfaces of the first and second preforms are face up in the golf ball component mold and form an inner surface of each half shell molding cup; and mating first and second half-shell molding cups about a subassembly under sufficient heat and pressure.

6. The method of claim 5, wherein the bladed edge is straight edged.

7. The method of claim 5, wherein the bladed edge is a curved edge that curves away from the opposing edge and contacts the extrudate and cross-sections it.

* * * * *